United States Patent [19]

Ohtuka et al.

[11] Patent Number: 4,763,229

[45] Date of Patent: Aug. 9, 1988

[54] ALUMINUM CAPACITOR PLATE FOR ELECTROLYTIC CAPACITOR AND PROCESS FOR MAKING THE SAME

[75] Inventors: Tatsuo Ohtuka, Oyamashi; Shiuchi Murooka, Yukishi; Satoko Arai, Fujiokamachi; Takeshi Nishizaki, Kouchi Naganoshi, all of Japan

[73] Assignee: Showa Aluminum Kabushiki Kaisha, Osaka, Japan

[21] Appl. No.: 137,416

[22] Filed: Dec. 23, 1987

[30] Foreign Application Priority Data

Dec. 24, 1986 [JP] Japan ................................ 61-310058
Dec. 24, 1986 [JP] Japan ................................ 61-310059

[51] Int. Cl.$^4$ .............................................. H01G 9/00
[52] U.S. Cl. ..................................... 361/433; 29/570.1
[58] Field of Search ........... 361/433 W, 433 L, 433 S, 361/433 A; 427/212, 214; 29/569.1, 570.1

[56] References Cited

U.S. PATENT DOCUMENTS

| 3,256,468 | 6/1966 | Jenny et al. | 361/433 A |
| 4,309,810 | 1/1982 | Drake | 29/570.1 |
| 4,468,719 | 8/1984 | Shimizu et al. | 361/433 A |

FOREIGN PATENT DOCUMENTS

| 131761 | 10/1979 | Japan | 361/433 C |
| 143022 | 11/1980 | Japan | 361/433 A |
| 676511 | 7/1952 | United Kingdom | 361/433 C |

Primary Examiner—Donald A. Griffin

[57] ABSTRACT

An aluminum capacitor plate for use in an electrolytic capacitor, the capacitor plate including a sponge-like layer in its surfacial portion, the layer including a plurality of projections projecting inward and outward, the projections individually having heights of not higher than 1 $\mu$m on average; and a titanium film having accumulated titanium particles each including projections having heights of not higher than 1 $\mu$m, wherein the titanium particles are unevenly distributed in the film with a number of pores interposed therebetween.

17 Claims, 7 Drawing Sheets

FIG. 15  $\overline{10\mu m}$

FIG. 16  $\overline{1\mu m}$

ALUMINUM CAPACITOR PLATE FOR ELECTROLYTIC CAPACITOR AND PROCESS FOR MAKING THE SAME

BACKGROUND OF THE INVENTION

1. Field of the Invention

The present invention relates to an aluminum capacitor plate for use in electrolytic capacitors and a process for producing the same. More particularly, the present invenion relates to an aluminum capacitor plate having an enhanced capacitance, and to a process for producing such capacitor plates, wherein the term "aluminum" includes pure aluminum and aluminum-based alloys. Hereinafter the electrolytic capacitor will be referred to merely as capacitor.

2. Description of the Prior Art

In order to minimize the size of capacitors without trading off their ability it is essential to increase the capacitance of capacitor plates. To this end many proposals have been made; for example, one is to increase the surface area of the capacitor plates, and another is to form a film having a high dielectric constant on the plates, and a further proposal is to form a thin film of a dielectric substance.

In line with such demands in the industry the inventors have made inventions on aluminum capacitor plates, which are disclosed in Japanese Patent Publication (unexamined) No. 61-180420 and No. 61-214420. According to these inventions the surface of an aluminum capacitor plate is previously roughened, and vapor-plated with a particle-inclusive uneven film of titanium. As a result the roughness on the titanium film is doubled by the uneven profile of the aluminum substratum, thereby increasing the surface area of the capacitor plate, and enhancing the capacitance thereof.

Under the conventional titanium vapor-plating process an aluminum plate (foil) is subjected to titanium vapor while it travels between one roll and another within the vacuum Bell-jar. This process is especially adapted for mass production.

Nevertheless the capacitance achieved by the process mentioned above is not sufficiently high, and actually the process allows for an improvement. The inventors have pursued the study, and has completed the present invention by recognizing that the aluminum plate and the titanium film must have particular interrelated structures.

OBJECTS AND SUMMARY OF THE INVENTION

The present invention aims at solving the problems pointed out with respect to the known capacitor plates and the known process of producing the same, and has for its object to provide an aluminum capacitor plate having an enhanced capacitance, and a process for producing such capacitor plates.

Other objects and advantages of the present invention will become more apparent from the following detailed description, when taken in conjunction with the accompanying drawings which show, for the purpose of illustration only, one embodiment in accordance with the present invenion.

According to the present invention there is provided an aluminum capacitor plate for use in an electrolytic capacitor, which plate comprises:

a layer of a sponge-like structure having a predetermined thickness, the layer including a plurality of projections extending inward and outward with respect thereto, the projections individually having heights of not higher than 1 $\mu$m on average; and a titanium film having accumulated titanium particles each including projections having heights of not higher than 1 $\mu$m, wherein the titanium particles are unevenly distributed in the film with a number of pores interposed therebetween.

The layer of sponge-like structure can be produced by controlling the etching conditions, in which a mixture of HCl and one or more solutions selected from $HNO_3$, $H_3PO_4$ and $H_2SO_4$ is used as an electrolyte.

The titanium film is preferably produced by more than two steps of vapor-plating; if the film having 1 $\mu$m or more is produced by a single step the temperature of the aluminum plate is likely to rise by the influences of the latent heat generated when the titanium condenses into particles and of the radiation from the source of heat for evaporating titanium. While the vapor-plating is in process the aluminum plate is cooled in a cooling vessel but nevertheless its temperature normally reaches 300° C. or more. Because of the high temperature of the aluminum plate the titanium particles tend to become fluid, and make a flat film. This negates the aim of producing a film having rugged surfaces and increasing the surface area of the aluminum plate.

Therefore it is essential to keep the surfacial temperature of the aluminum plate below 300° C. throughout the vapor-plating process, and also to repeat several steps of vapor-plating with the use of a minimum dose of titanium each time, thereby producing multi-plied titanium layers. More specifically, a first step of vapor-plating is applied to the aluminum plate while it is rolled up, and a second step is applied to it while being unrolled. In this way a third step, a fourth step and so on are applied until a desired number of layers are produced.

DETAILED DESCRIPTION OF THE PREFERRED EMBODIMENTS

Figure 1:
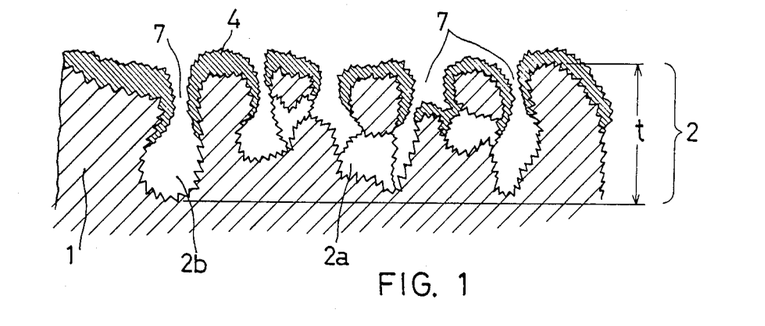
FIG. 1 is a diagrammatic cross-sectional view showing the surfacial portion of an aluminum capacitor plate embodying the present invention.
Figure 2:
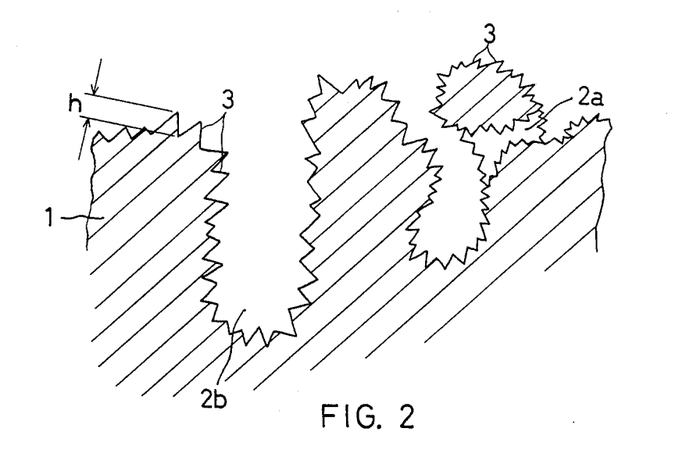
FIG. 2 is a diagrammatic cross-sectional view particularly showing the sponge-like layer produced in the top surfacial portion of the aluminum plate.

Referring to FIGS. 1 and 2 the capacitor plate of the invention has a substratum 1 of aluminum plate (foil) having an etched layer 2 of sponge-like structure extending to a predetermined thickness (t). The songe-like layer 2 is provided with a vapor-plated titanium film 4, whose surface is made uneven by etching. The substratum 1 is made of a material adapted for producing the sponge-like layer 2 therein. Preferably pure aluminum or at least A1100 grade aluminum is used but the material is not limited thereto. The aluminum plate (foil) is preferably 15 to 70 $\mu$m thick.

The sponge-like layer 2 contains a number of pores, among which the pores 2a communicate with one another, while the pores 2b are closed for each other. Preferably the pores 2a, 2b are made of pits of 0.01 to 5 $\mu$m on average, wherein the pores 2a are solely or jointly present, but such larger size of pits as 1.2 to 40 $\mu$m may be present from place to place. In addition, the sponge-like layer 2 is preferably made rugged with hills having heights of 0.01 to 5 $\mu$m. The volumetric percentage of the pores 2a and 2b is 30 to 80% for the whole sponge-like layer 2. The sponge-like layer 2 may be produced on one of the surfaces of the substratum 1 or on both surfaces thereof. The thickness (t) of the sponge-like layer 2 is preferably in the range of 2.5 to 25 $\mu$m, that is, when it is provided on both surfaces the total thickness may be in the range of 5 to 50 $\mu$m, provided that it is within 30 to 85% of the total thickness of the substratum 1. If the sponge-like layer 2 is less than 2.5 $\mu$m thick, it is likely that the titanium film fails to extend fully thereon, and that the surface area of the capacitor plate is not increased sufficiently to enhance the capacitance thereof. If the thickness of the layer 2 exceeds 25 $\mu$m the substratum 1 relatively becomes thin, thereby making the plate fragile. Most preferably the thickness of the layer 2 is in the range of 5 to 20 $\mu$m on either side of the surfaces.

The sponge-like layer 2 is also provided with small projections 3 of 1 $\mu$m or less high, extending toward the pores 2a and 2b. Because of the underlying projections 3 the overlying titanium film 4 is made rugged on its surface, thereby increasing the surface area thereof. However if the height (h) of the projections 3 are higher than 1 $\mu$m the surface area of the titanium film do not increase so much. The optimum height is in the range of 0.1 to 0.5 $\mu$m.

The sponge-like layer 2 including the projections 3 are produced by etching. The etching process is carried out under selected conditions; for example, the compositions of the electrolyte are selected from a particular group, the temperature of the electrolyte is variously adjusted, and the time of operation is prolonged or shortened. One example of it will be illustrated:

The etching can be electro-chemical or chemical. The electrolyte can be selected from a mixture of HCl, $HNO_3$ and $H_3PO_4$; a mixture of HCl, $HNO_3$, $H_3PO_4$ and $H_2SO_4$; a mixture of HCl, $HNO_3$, $H_3PO_4$ and $H_2SO_4$; a mixture of HCl, $HNO_3$, $H_3PO_4$ $H_2SO_4$ and $AlCl_3$; a mixture of HCl and $H_2C_2O_4$; and a HCl solution. The temperature is preferably 30° to 85° C., and the etching is normally continued for 1 to 10 minutes but it depends upon the other etching conditions. In the case of electro-chemical etching an alternating current is preferably used but of course a direct current can be used. The current density is adjusted to 3 to 30A/dm$^2$. The etching can be finished with a single dose of titanium, two doses, three does or more, depending upon the desired thickness of the titanium film.

Figure 3:
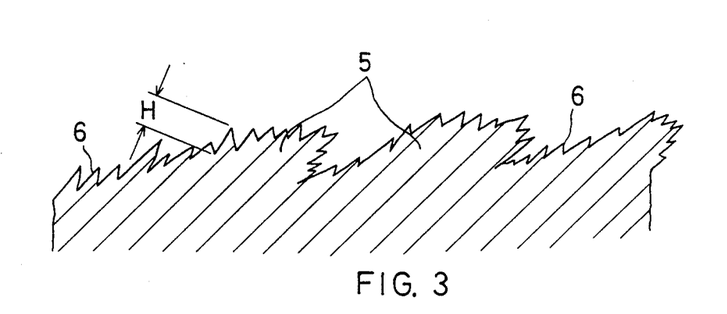
FIG. 3 is a diagrammatic cross-sectional view showing the surfacial portion of a titanium film, particularly to show the accumulating scale-like particles thereof.
Figure 4:
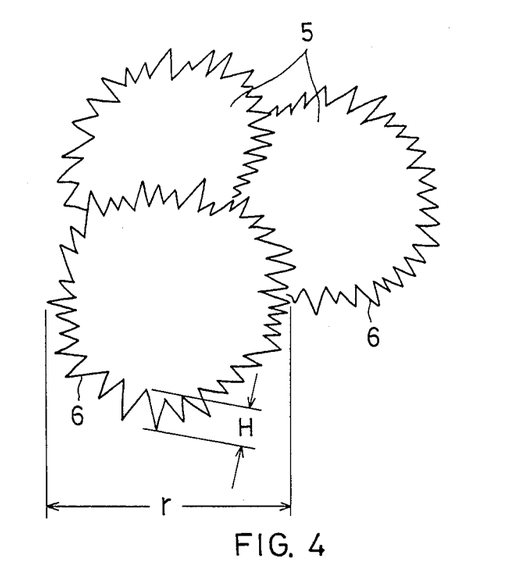
FIG. 4 is a diagrammatic plan view showing the accumulating spherical titanium particles.
Figure 5:
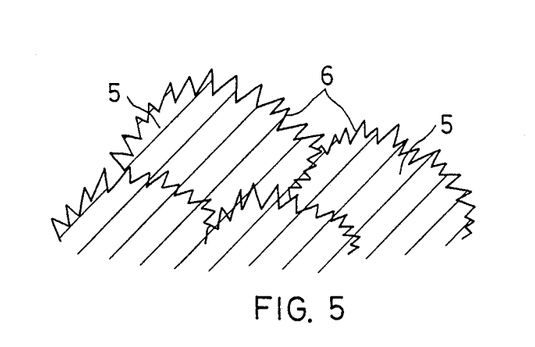
FIG. 5 is a diagrammatic cross-sectional view of the titanium particles of FIG. 4.

The reason why the substance of the outer film is limited to titanium is its superior durability as compared with other electrically conductive metals, such as iron and copper. The durability of the outer film leads to the long life and reliability of the capacitor. The titanium particles are generally shaped as shown in FIGS. 3 to 5; in FIG. 3 they are scaled-shaped, and in FIGS. 4 and 5 they are spherical. The titanium film 4 consists essentially of the accumulating particles. Each scale-shaped particle 5 includes small projections 6 having an average height (H) of 1 $\mu$m or less, thereby making the surface of the film rugged. However if the height (H) exceeds 1 $\mu$m the surface area is not sufficiently increased to enahnce the capacitance of the plate. The optimum height (H) is in the range of 0.1 to 0.6 $\mu$m. When the particles 5 are spherical the average diameter (r) including the projections 6 is preferably in the range of 0.5 to 3 $\mu$m.

The titanium film 4 also includes valleys 7 having depths of 20 $\mu$m or less on average. The valleys 7 and the projections 6 impart a combined ruggedness to the surface of the titanium film, thereby increasing the surface area thereof. The increased surface area of the outer film 4 leads to the enhanced capacitance of the capacitor plate. The entire inside walls of the valleys 7 are preferably covered with the titanium film but the aluminum of the substratum 1 may be exposed therein.

It is not necessary for the titanium particles to take the same shape in one substratum 1, but it is possible for a mixture of scale-shaped particles and spherical particles to be present therein. A portion where the scaled-shaped particles gather becomes flatter than a portion where the spherical ones gather but even the apparent flat portions include the projections 6 having a height of 1 $\mu$m or less though they are not visible with naked eyes.

As described above the conditions for carrying out the titanium vapor-plating can be variously decided but it is important that the surfacial temperature of the aluminum substratum 1 is kept at not higher than 300° C. If it exceeds 300° C. the titanium particles 5 accumulating on the surface of the substratum 1 are likely to become molten and fluid, thereby producing a flat surface. As a result the projections 6 are not produced. If the surfacial temperature is too low the titanium particles 5 are difficult to stick to the substratum 1. The optimum range is 50° to 200° C. The vapor-plating process is preferably carried out in an atmosphere of an inert gas at a pressure of $1 \times 10^{-4}$ to $5 \times 10^{-3}$ Torr.

Figure 6:
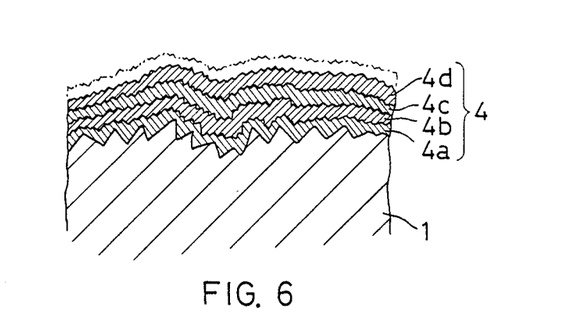
FIG. 6 is a diagrammatic cross-sectional view showing the state of the titanium multi-plied layers.

The production of the titanium film is effected as follows:

A first dose of titanium is plated on the surface of the substratum 1 by a first step of vaporing, and as shown in FIG. 6 the first layer 4a is produced. As the amount of titanium is small the temperature of the substratum 1 does not rise very high. After the plated substratum 1 is allowed to cool, a second dose is applied to the first layer 4a to produce a second layer 4b. Subsequently a third dose, a fourth dose and so on are consecutively applied so as to produce a third layer 4c, a fourth layer 4d and so on. In this way the substratum 1 is kept at a relatively low temperature throughout the process.

Figure 7:
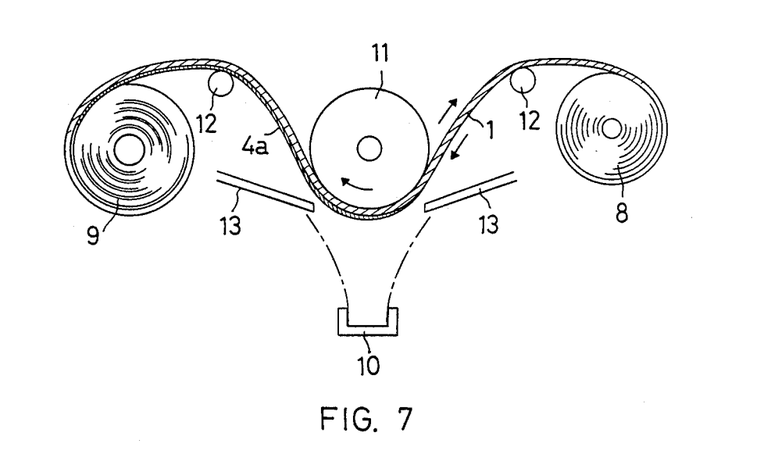
FIG. 7 is a schematic view showing a device for use in the vapor-plating process.

The intermittent application of the titanium vapor is carried out by the use of the device shown in FIG. 7. The aluminum platee (foil) is previously rolled up into a first roll 8 within a Bell-jar (not shown). The plate is unwound from the roll 8, and rolled up into a second roll 9. During the travel the plate is kept in contact with the undersurface of a cooling roller 11, and receives titanium vapor caused by an electronic beam generator 10. In this way the plate having the first layer 4a is rolled up into the roll 9. Then the plate is unwound from the roll 9, and returned toward the first roll 8 during which it is subjected to the same process, thereby having the second titanium layer 4b. The same procedure is repeated until the desired number of layers are produced. The reference numerals 12 and 13 denote guide rollers and a shield, respectively.

Under the device showin in FIG. 7 it is possible to change the speeds of winding and unwinding the aluminum plate, thereby varying the conditions of forming the titanium film. In addition, since the travelling plate keeps contact with the spherical profile of the cooling roller 11 it can receive titanium vapor at various angles of incidence from the beam generator 10. The application of titanium vapor at different angles of incidence is conducive to the formation of a rugged surface.

The total thickness of the titanium layers is preferably in the range of 0.1 to 3.0 $\mu$m (it amounts to 0.045 to 1.35 mg/cm$^2$ in terms of quantity). If the total thickness is less than 0.1 $\mu$m, the surface of the film is likely to fail to have a rugged surface but to become flat, thereby leading to the decreased capacitance. If it exceeds 3 $\mu$m no increased effects result only to lead to the waste of titanium.

The number of the titanium layers is preferably in the range of 2 to 10, which means that the preferred doses of titanium are 2 to 10 times. The experiments have demonstrated that even if more than 10 doses are applied to the substratum no increased effects result only to lead to the increased production cost.

The speed of the vapor-plating is determined depending upon the desired thickness of the titanium film and the number of doses. Preferably the speed is adjusted to 100 to 5000 Å/sec ($4.5 \times 10^{-3}$ to 0.225 mg/cm$^2$ sec in terms of quantity). If the speed exceeds 5000 Å/sec the ambient pressure fails to affect the process favorably. The increased capacitance cannot be expected. If the speed slows down up to less than 100 Å/sec the working efficiency is reduced, thereby resulting in the increased production cost. The process is carried out in the atmosphere of an inert gas, such as Ar, wherein the pressure is preferably adjusted to $5 \times 10^{-5}$ to $5 \times 10^{-3}$ Torr. The inert gas atmosphere is conducive to the formation of a rough surface. If the pressure is less than $5 \times 10^{-5}$ Torr the surfacial particles are likely to become too small, thereby failing to increase the capacitance of the capacitor plate. In contrast, if the ambient pressure exceeds $5 \times 10^{-3}$ Torr the titanium particles become difficult not only to evaporate but also to stick to the aluminum substratum 1. The experiments have revealed that the optimum presssure is $1 \times 10^{-3}$ Torr, which is particularly adapted for the mass production. The distance over which the titanium particles fly is preferably 150 to 400 mm. If it exceeds 400 mm the titanium is difficult to stick to the aluminum substratum 1; in other words, a large quantity of titanium vapor is wasted without forming the film. In contrast, if the distance is less than 150 mm an advantage is that a larger quantity of titanium can deposit on the substratum, but it is traded off by the disadvantages that the substratum is heated by radiation from the beam generator, and that the influence of the ambient pressure weakens, thereby leading to the inadequate production of the titanium film. As a result, the capacitance of the capacitor plate does not increase.

The aluminum plate covered with the titanium film can be used as a nagative electrode for electrolytic capacitors without having any further process but if it is treated in a solution of boric acid, ammonium borate, tartaric acid, or ammonium tartrate or an aqueous solution thereof so as to cover it with an oxidized film, it can be used as a positive electrode.

According to the present invention the capaccitor plate is provided with a sponge-like rough surface, and then covered with a titanium film so as to produce the doubled rugged surfaces. In addition, the titanium film includes as small projections as 1 $\mu$m or less in height with pores interlocated therebetween. As a result the surface area of the aluminum plate is considerably increased, thereby enhancing the capacitance of the electrolytic capacitor.

The present invention will be better understood from the following examples, which, however, do not limit the invention:

EXAMPLE 1

Figure 8:
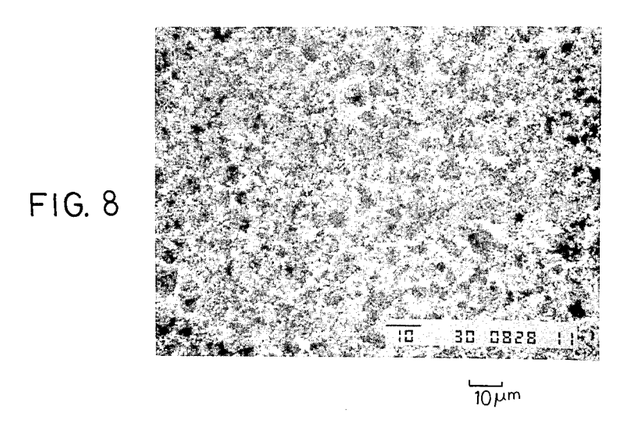
FIG. 8 is a microscopic photograph showing the surface of the aluminum plate after a first example of ething is applied thereto.
Figure 9:
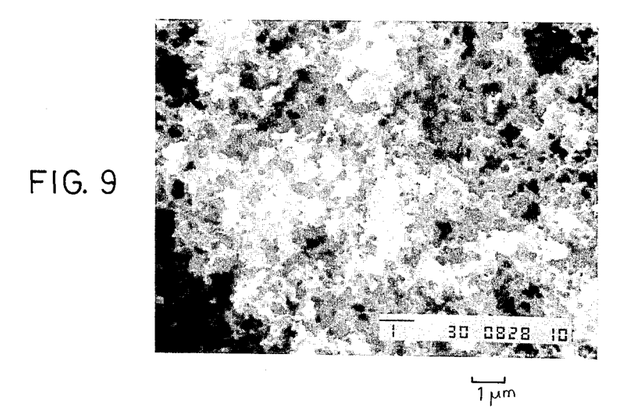
FIG. 9 is a microscopic photograph enlarged from FIG. 8.
Figure 10:
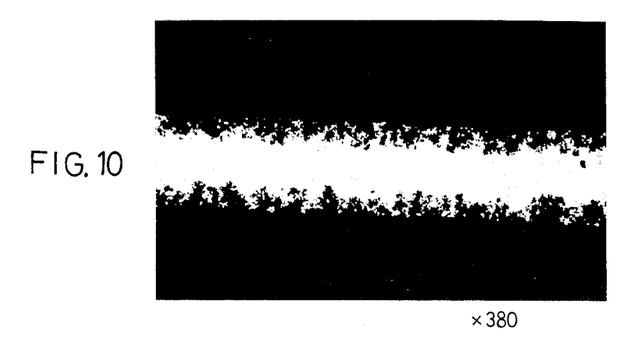
FIG. 10 is a microscopic photograph showing the cross-section of the surface of the plate shown in FIG. 8.

An aluminum foil of 50 $\mu$m in thickness and of 99.8% purity was immersed in a solution, heated at 50° C., containing 200 ml/l of HCl, 6 ml/l of HNO$_3$, 3 ml/l of H$_3$PO$_4$ and 1 ml/l of H$_2$SO$_4$, and subjected to an a. c. electrolytic etching at a current density of 20A/dm$_2$ for two minutes. The foil had a spong-like layer of 16 $\mu$m at maximum on one side, which had pores each being made up of one or more pits of averagely 0.06 to 1.9 $\mu$m in depth. Partly the pores gathered and grew as large as 1.2 to 25 $\mu$m deep. In the top portion of the sponge-like layer the aluminum substratum was present in the form of projections of averagely 0.06 to 2.5 $\mu$m in height. The volumetric ratio of all the pores to the layer was about 58%. The sponge-like layer had projections of averagely 0.5 $\mu$m in height on its surface. FIGS. 8 and 9 show microscopic views of the surface of the aluminum foil.

Figure 13:
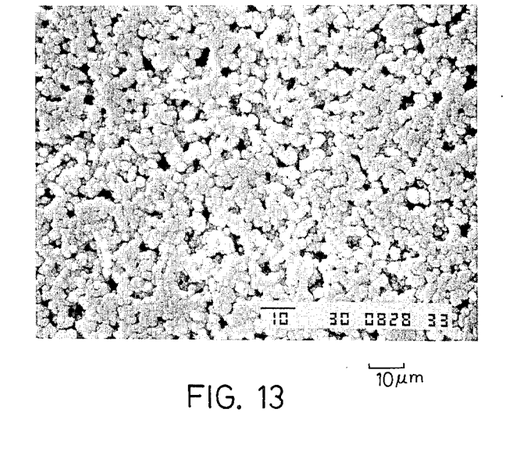
FIG. 13 is a microscopic photograph showing the titanium vapor-plated film produced on the aluminum plate in the first example.
Figure 14:
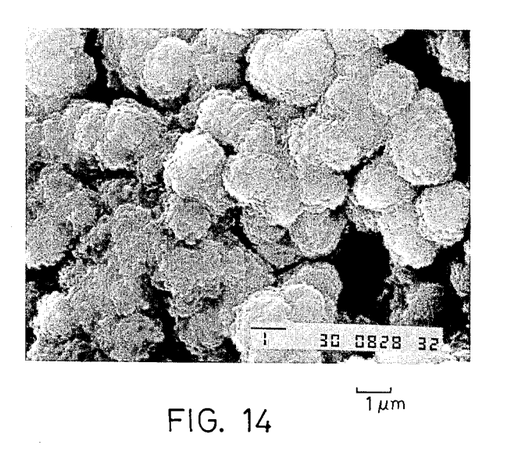
FIG. 14 is a microscopic photograph enlarged from FIG. 13.

The aluminum foil whose surfacial temperature was kept at 100° C. was placed in an atmosphere of $1 \times 10^{-3}$ Torr of argon. Then a titanium vapor-plating was conducted on the aluminum foil at a distance of 250 mm, at a speed of $5 \times 10^{-3}$ mg/cm$^2$ sec. The titanium film of averagely 0.5 mg/cm$^2$ was produced on the aluminum foil. As shown in FIG. 13 the film was made up of virtually spherical titanium particles having lengths of 1.0 to 3.0 $\mu$m, and as shown in FIG. 14 each particle had small projections of averagely 0.3 $\mu$m in height.

EXAMPLE 2

Figure 11:
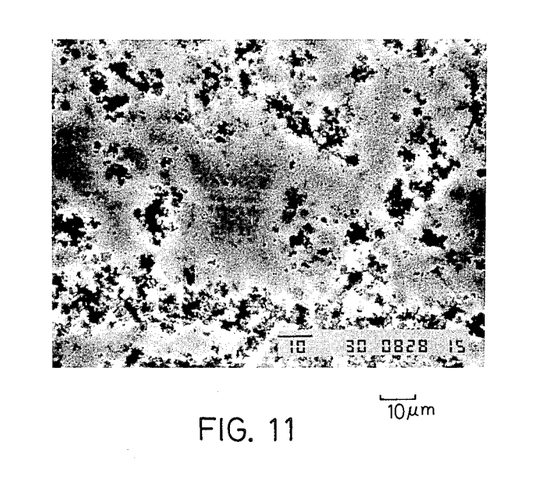
FIG. 11 is a microscopic photograph showing the surface of the aluminum plate after a second example of ething is applied thereto.
Figure 12:
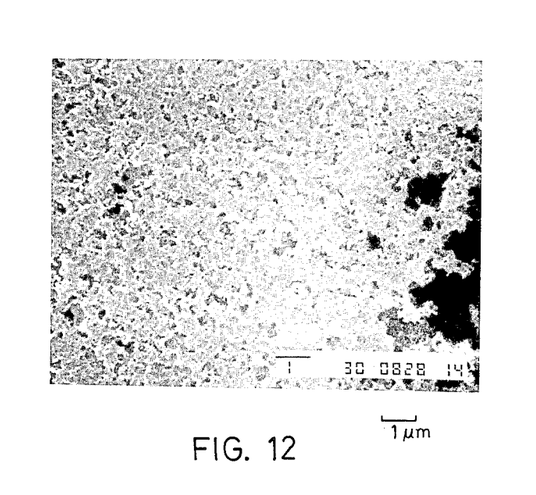
FIG. 12 is a microscopic photograph enlarged from FIG. 11.

An aluminum foil of 40 $\mu$m in thickness and of 99.0% purity was immersed in a solution, heated at 50° C., containing 50 ml/l of HCl, 2 ml/l of HNO$_3$ and 3ml/l of $H_3PO_4$, and subjected to an a.c. electrolytic etching at a current density of 30A/dm² for two minutes. The foil had a spong-like layer of 16 μm at maximum on one side, which had pores each being made up of one or more pits of averagely 0.05 to 1.7 μm in depth. Partly the pores gathered to grow as large as 1.0 to 20 μm. In the top portion of the sponge-like layer the aluminum substratum was present in the form of bulges of averagely 0.06 to 2.5 μm in height. The volumetric ratio of all the pores to the layer was about 50%. The sponge-like layer had small projections of averagely 0.4 μm high on its surface. FIGS. 11 and 12 show microscopic views of the surface of the aluminum foil.

Figure 15:
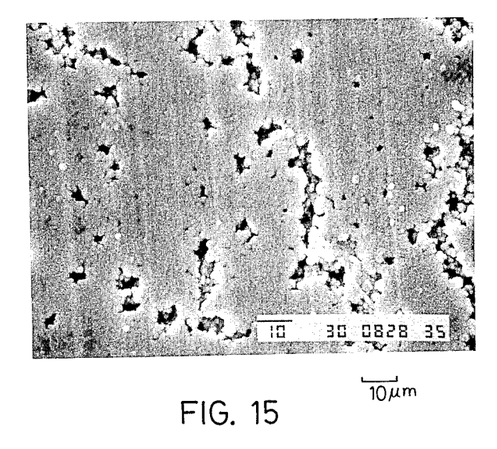
FIG. 15 is a microscopic photograph showing the titanium vapor-plated film produced on the aluminum plate in the second example.
Figure 16:
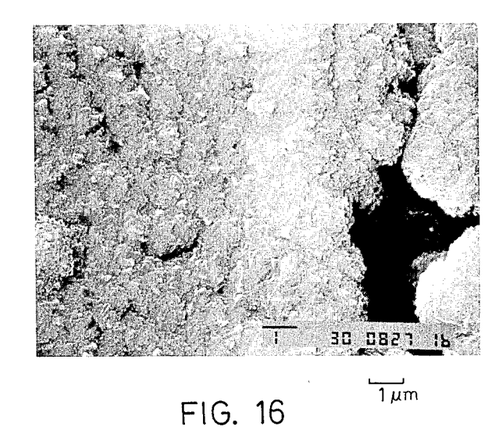
FIG. 16 is a microscopic photograph enlarged from FIG. 15.

The aluminum foil was heated to 50° C. on its surface, and placed in an atmosphere of $1 \times 10^{-4}$ Torr of argon. Then a titanium vapor-plating was conducted on the aluminum foil at a distance of 300 mm, at a speed of 0.05 mg/cm² sec. The titanium film of averagely 0.5 mg/cm² was produced on the aluminum foil. As shown in FIG. 15 the film was made up of scaled-shaped titanium particles and spherical particles having lengths of 1.0 to 3.0 μm, wherein the spherical particles stick to the apparent flat top portions of the scaled-shaped particles. Each particle was recognized to have projections of averagely 0.3 μm in height, as shown in FIG. 16. In addition, the titanium film had a number of pores of 20 μm or less in depth, some of which had the aluminum substratum exposed in their inside walls.

EXAMPLE 3

The same aluminum foil as used in the Example (1) was immersed in a solution, heated at 95° C., containing 150ml/l of HCl, 10 ml/l of $HNO_3$ and 2 ml/l of $H_2SO_4$, and subjected to a chemical etching for two minutes. The foil had a spong-like layer of 10 μm at maximum on one side, which had pores each being made up of one or more pits of averagely 0.08 to 2.5 μm in depth. Partly the pores gathered to grow as large as 1.0 to 30 μm. In the top portion of the sponge-like layer the aluminum substratum was present in the form of projections of averagely 0.08 to 3.0 μm in height. The volumetric ratio of all the pores to the layer was about 50%. The sponge-like layer had projections of averagely 0.5 μm in height on its surface.

The aluminum foil was subjected to titanium vapor-plating under the same conditions as those for the Example (1). The aluminum foil had a titanium film of averagely 0.45 mg/cm².

EXAMPLE 4

The same aluminum foil as used in the Example (1) was subjected to the same etching and titanium vapor-plating as those conducted in the Example (1). The processed aluminum foil was treated in a solution of ammonium tartrate heated to 35° C. at a voltage of d.c 4V. The titanium film and the aluminum substratum exposed in the depths of the pores in the sponge-like layers were covered with an oxidized film of 120 μm or less in thickness.

The capacitances of the aluminum foils processed in the Examples (1) to (4) were measured in a solution of 10% of ammonium borate, having a temperature of 30° C. The results are shown in Table (1):

TABLE (1)

| Specimen | Leakage Current (mA/cm² PA) | Capacitances (μF/cm² PA) |
| --- | --- | --- |
| Example 1 | — | 1250 |
| Example 2 | — | 1130 |
| Example 3 | — | 1210 |
| Example 4 | 0.021 | 510 |

As is evident from the results shown above the capacitances of the capacitor using the capacitor plate produced under the present invention have been considerably enhanced.

What is claimed is:

1. An aluminum capacitor plate for use in an electrolytic capacitor, the capacitor plate comprising:
   a layer of a sponge-like structure having a predetermined thickness, the layer including a plurality of projections projecting inward and outward with respect thereto, the projections individually having heights of not higher than 1 μm on average; and
   a titanium film having accumulated titanium particles each including projections having heights of not higher than 1 μm, wherein the titanium particles are unevenly distributed in the film with a number of pores interposed therebetween.

2. An aluminum capacitor plate as defined in claim 1, wherein the projections in the sponge-like layer are averagely 0.1 to 0.5 μm high.

3. An aluminum capacitor plate as defined in claim 1, wherein the sponge-like layer is 2.5 to 25 μm thick.

4. An aluminum capacitor plate as defined in claim 1, wherein the volumetric ratio of the pores to the sponge-like layer is 30 to 80%.

5. An aluminum capacitor plate as defined in claim 1, wherein the projections in the titanium film are averagely 0.1 to 0.6 μm high.

6. An aluminum capacitor plate as defined in claim 1, wherein the titanium film is 0.2 to 3.0 μm thick.

7. An aluminum capacitor plate as defined in claim 1, wherein the pores in the titanium film are averagely 20 μm or less in depth.

8. A process for producing capacitor plates for use in elecrolytic capacitors, the process comprising:
   etching for producing a sponge-like layer in a surfacial portion of an aluminum substratum, the layer including a plurality of projections of 1 μm or less in height projecting outward and inward with respect to the layer; and
   titanium vapor-plating for producing a titanium film on the sponge-like layer, the titanium film being substantially made up of scale-shaped or spherical titanium particles including projections of 1 μm or less in height.

9. A process for producing capacitor plates as defined in claim 8, wherein the etching is an electrolytic etching with the use of an electrolyte containing HCl, $HNO_3$, $H_3PO_4$ and $H_2SO_4$.

10. A process for producing capacitor plates as defined in claim 8 wherein the etching is an electrolytic etching with the use of an electrolyte containing HCl, $HNO_3$ and $H_3PO_4$.

11. A process for producing capacitor plates as defined in claim 8, wherein the etching is a chemical etching with the use of an electrolyte containing HCl, $HNO_3$ and $H_2SO_4$.

12. A process for producing capacitor plates as defined in claim 8, wherein the surface of the aluminum substratum is kept at not higher than 300° C. throughout the titanium vapor-plating process.

13. A process for producing capacitor plates as defined in claim 12, wherein the surface of the aluminum substratum is kept at a temperature of 50° to 150° C. throughout the titanium vapor-plating process.

14. A process for producing capacitor plates as defined in claim 8, wherein the titanium vapor-plating process is conducted at an atmosphere of an inert gas at a pressure of $1 \times 10^{-4}$ to $5 \times 10^{-3}$ Torr, at an evaporating distance of 150 to 400 mm, at a vapor-plating speed of $4.5 \times 10^{-3}$ to 0.225 mg/cm$^2$ sec.

15. A process for producing capacitor plates as defined in claim 8, wherein the titanium vapor-plating process comprises several unit steps in each of which a small dose of titanium is vapor-plated to the aluminum so that the titanium film is produced in multi-plied layers.

16. A process for producing capacitor plates as defined in claim 15, wherein the unit steps are repeated in the range of 2 to 10 times.

17. A process for producing capacitor plates as defined in claim 15, wherein the unit steps are conducted on the aluminum substratum while it travels between a first roll and a second roll until a desired number of titanium layers are piled.

* * * * *